United States Patent [19]

Notarione et al.

[11] 4,372,463

[45] Feb. 8, 1983

[54] APPARATUS AND METHOD FOR FEEDING THIN PARTS

[75] Inventors: Patrick D. Notarione, Sagertown; Ronald K. Turk; Gerald Grafius, both of Erie, all of Pa.

[73] Assignee: Swanson-Erie Corporation, Erie, Pa.

[21] Appl. No.: 210,853

[22] Filed: Nov. 26, 1980

[51] Int. Cl.³ ............................................. B65H 1/30
[52] U.S. Cl. ..................................... 221/10; 221/251
[58] Field of Search ..................... 221/10, 200, 13, 14, 221/251, 212, 17, 176, 11; 271/18.1, 18.2; 413/70, 45, 46

[56] References Cited

U.S. PATENT DOCUMENTS

| | | |
|---|---|---|
| 2,685,271 | 8/1954 | Essen .............................. 271/18.2 X |
| 2,855,197 | 10/1958 | Nash ..................................... 271/18.2 |
| 2,887,209 | 5/1956 | Merchant . |
| 2,962,846 | 12/1960 | Marindin . |
| 2,990,940 | 7/1961 | Merchant . |
| 3,065,530 | 11/1962 | Merchant et al. . |
| 3,143,792 | 8/1964 | Swanson et al. . |
| 3,231,968 | 2/1966 | Swanson . |
| 3,359,619 | 12/1967 | Walkden . |
| 3,497,086 | 2/1970 | Adams et al. ...................... 221/13 X |
| 3,551,993 | 1/1971 | Cassai et al. . |
| 3,939,544 | 2/1976 | Stevens . |
| 3,998,448 | 12/1976 | Gray et al. ......................... 271/18.1 |
| 4,184,236 | 1/1980 | Nutt . |

Primary Examiner—Stanley H. Tollberg
Attorney, Agent, or Firm—Hume, Clement, Brinks, Willian & Olds, Ltd.

[57] ABSTRACT

An apparatus is made of a tube for containing a number of thin parts in a stack arrangement, having a loading end and a dispensing end, a device for feeding parts to the separating device, from the loading end to the dispensing end of the tube, and a device positioned at the dispensing end of the tube for separating at least one of the parts from the remainder of the parts and positioning the part at the dispensing of the tube for pick-up. A method for feeding and positioning a thin part to be grasped by a pick-up device includes stacking thin parts in a tube, separating one of the parts from the stack, positioning the part at the end of the tube for pick-up, and feeding more parts to the separating step.

15 Claims, 7 Drawing Figures

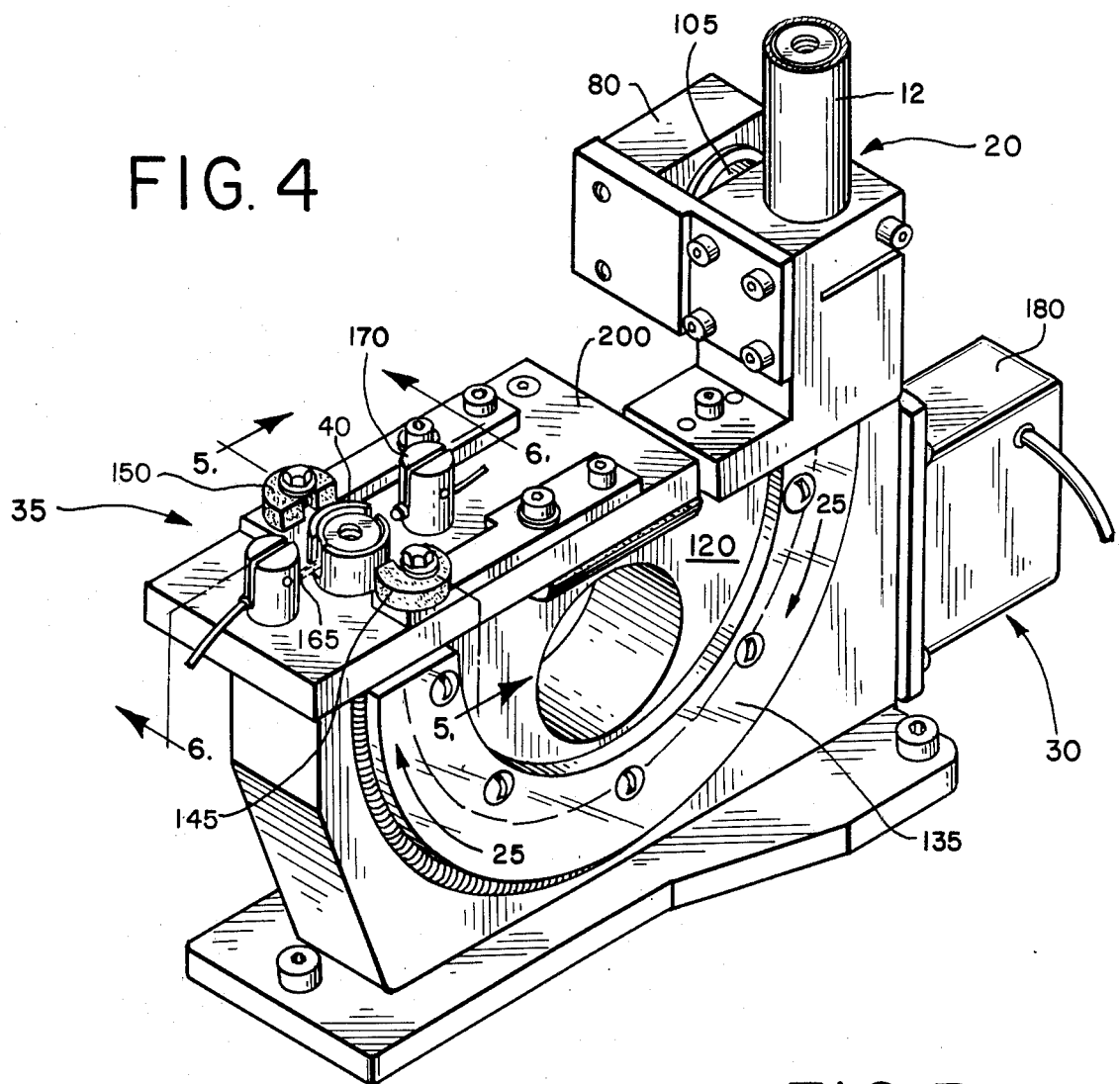
FIG. 4
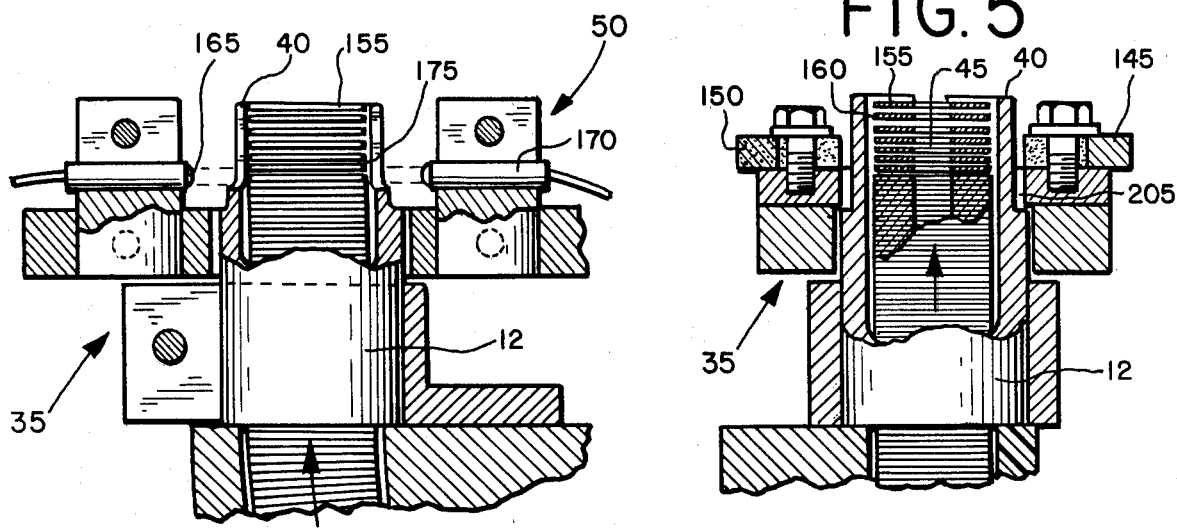
FIG. 5
FIG. 6

APPARATUS AND METHOD FOR FEEDING THIN PARTS

BACKGROUND AND SUMMARY OF THE INVENTION

This invention relates to parts-handling apparatus and more particularly to an apparatus and method for feeding and positioning parts having a thin profile for assembly with an article.

Assembly machines are used to automatically assemble an article from its component parts. Injector razors, spark plugs, and light bulbs are but a few of the types of articles typically assembled by assembly machines. The assembly machines may be of the "rotary" type, such as disclosed in U.S. Pat. Nos. 3,065,530 and 3,231,968, assigned to the assignee of the present invention, or of the "in-line" type, such as disclosed in U.S. Pat. Nos. 2,887,209 and 2,990,940, also assigned to the assignee of the present invention.

Component parts for these articles assembled by such assembly machines often include relatively thin parts, having a cross-sectional dimension of less than one hundred mils (thousandths of an inch). These thin parts may be regular, circular washers or discs, or may have non-circular configurations or irregular central openings. Attempts have previously been made to position and feed thin parts consistently, accurately, and automatically to assembly machines. However such efforts have not always been fully successful.

Several problems arise in handling thin parts. Each part typically must be added to an article assembly one at a time. However, thin parts have a tendency to stick to one another because of the surface tension or capillarity of minute amounts of liquid, such as water or oil, that are usually present in the environment in which such parts are used. Also, parts with irregular central openings or peripheral edges tend to bunch up and interlock when fed in such a way that they pass across or on top of one another.

Prior attempts to handle, feed, separate and position such thin parts for pick-up include transverse feeding and stack feeding apparatus. Transverse feeding presented significant problems because of bunching and interlocking parts. Parts may bunch up because they are warped, have variances in thickness, or are otherwise malformed. Attempts to separate bunched or stuck parts by passing them under a gate or through a slot often failed because the parts were so thin that they clogged the gate or slot instead of being separated by it.

Known stack feeding apparatus for assembly machines include a slide feed with a straight stack and a floating arbor arrangement with a curved stack. A straight stack, slide feed arrangement is shown in FIGS. 1 through 5 of U.S. Pat. No. 3,231,968, particularly identified by reference numerals 12, 25, and 36. In the known floating arbor arrangement, washers were continuously fed on a U-shaped or J-shaped arbor to a separating means, such as a pair of opposed magnets, to operate on parts capable of being magnetized. Level sensors were also used to detect when the arbor needed to be reloaded with washers. The use of arbors generally requires parts having a uniform central opening on which the parts can be fed. If the arbor could be designed to accommodate an irregular opening in a part or a part with a slit passing through its center to its edge, then specific arbors had to be designed for particular parts and the general utility and applicability of the parts feeder and positioner using the arbor was limited. Also, arbors are not always suitable for holding parts that have relatively small openings in a stack arrangement. Arbors sometimes cannot be made strong enough to hold the weight of a plurality of parts on them.

Accordingly, the present invention overcomes disadvantages of the prior art by providing an apparatus and method that does not rely on a floating arbor or a slide feed arrangement for handling, feeding, and positioning thin profile parts. The apparatus and method of the present invention operate on thin parts with irregular central openings or peripheral edges and warped or otherwise malformed parts without substantial bunching, jamming, or interlocking. The present invention provide handling, feeding, and positioning of thin parts with simple and economical operation, versatility, and reliability in use. Other objects and advantages of the present invention will become apparent as the description of the invention proceeds.

Briefly, in accordance with the invention, there is provided an apparatus with a tube containing a number of thin parts in a stack arrangement, having a loading end and a dispensing end, a device for feeding parts to the separating device, from the loading end to the dispensing end of the tube, and a device positioned at the dispensing end of the tube for separating at least one of the parts from the remainder of the parts and positioning the part at the dispensing end of the tube for pick-up. Thus, parts are separated one at a time which facilitates handling of the part to the article assembly. Even if the parts have a tendency to stick together because a foreign substance is lodged between them, the separating device of the present invention is designed to separate the parts. Furthermore, parts with irregular shapes and designs may now be reliably, economically, and easily fed to machines to assemble articles.

Preferably, the length of the tube is straight or J-shaped. The J-shaped tube may be used to invert a part. The feeding means in the preferred embodiment includes brake means to control movement of the parts along the tube and sensing means for measuring the number of parts located at the separating means. The sensing means in the preferred embodiment includes photoelectric detector means for receiving a light beam projected through the tube which generates a signal for releasing the brake means. Also, the separating means in the preferred embodiment includes at least two like magnetic poles generating a magnetic field across the dispensing end of the tube. The intensity of the field is sufficient to induce repulsive magnetic forces in the parts so that they do not contact each other.

In keeping with the present invention, a method for feeding and positioning a thin part to be grasped by a pick-up device is provided, which includes stacking thin parts in a tube, separating one of the parts from the stack, positioning the part at the end of the tube for pick-up, and feeding more parts to the separating step. Thus, a simple and economical method allows articles to be manufactured without elaborate equipment. Yet, the problems previously discussed are alleviated. Also, the method may include removing the positioned part from the end of the tube and placing the part on an assembly table.

Preferably, the stacking step includes vibrating the parts out of a hopper and directing the parts into the tube. The separating step of the preferred embodiment includes generating a magnetic field between like poles of a magnet and applying the field to the parts. Also, the feeding means of the preferred embodiment includes disposing brake means to control movement of the parts in the tube, measuring the number of parts at the separating step by receiving a light beam projected through the tube with photoelectric detector means and generating an output signal, releasing the brake means, and re-engaging the brake means when the number of parts increase to a preset limit.

While the invention will be described in connection with preferred embodiments, it will be understood that it is not intended to limit the invention thereto, but rather to cover all modifications and alternative constructions falling within the spirit and scope of the invention as broadly defined. The invention will be further described in conjunction with the appended drawings.

BRIEF DESCRIPTION OF THE DRAWINGS

FIG. 4 is a perspective view of a portion of the apparatus shown in FIG. 1, including the dispensing end where parts are positioned;

FIG. 5 is a sectional view of the parts separating means shown in FIG. 4 along lines 5—5;

FIG. 6 is a sectional view of the parts sensing means shown in FIG. 4 along lines 6—6;

DETAILED DESCRIPTION OF THE PREFERRED EMBODIMENTS

Figure 1:
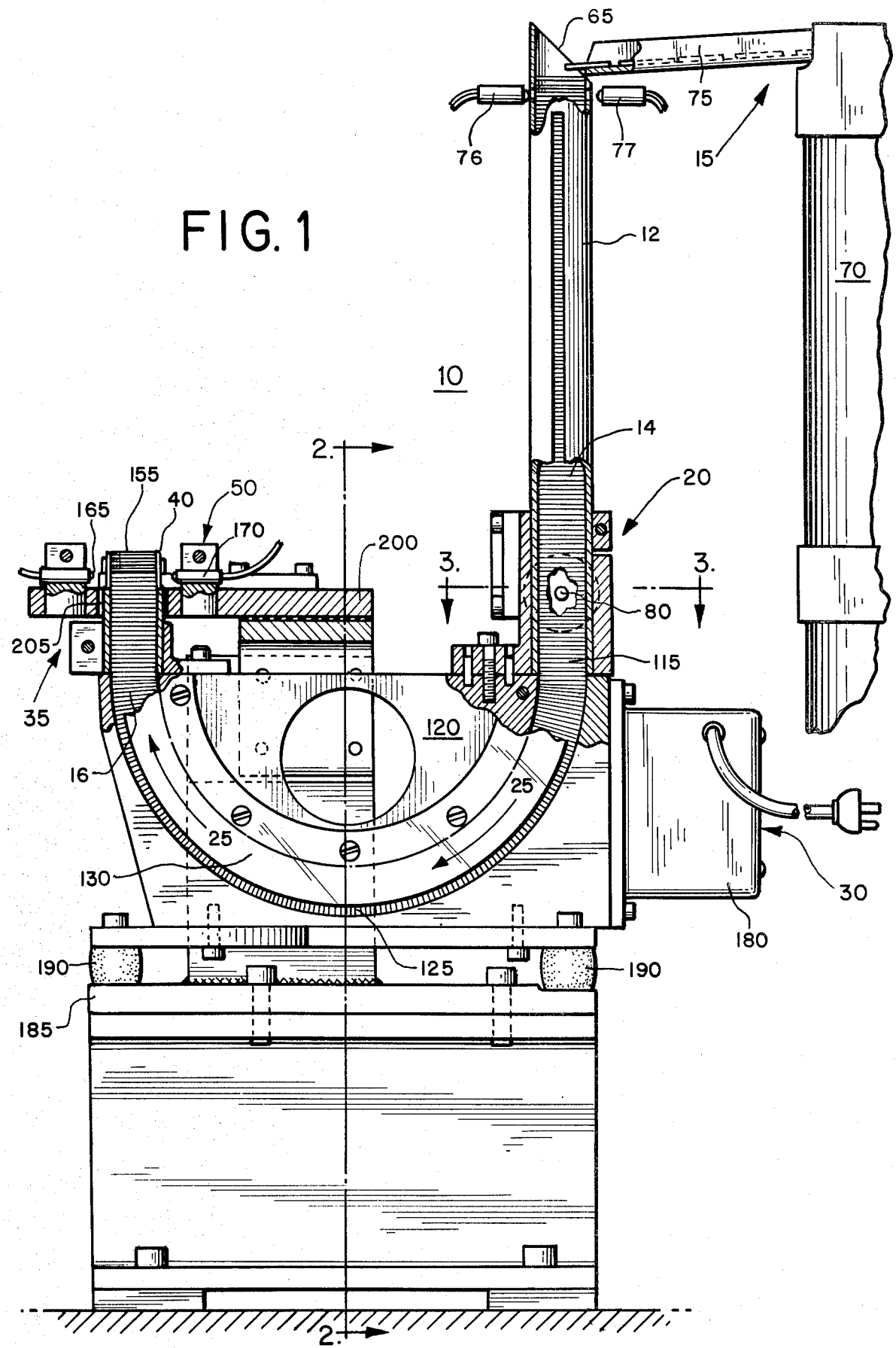
FIG. 1 is a front view of an apparatus for positioning thin parts utilizing the teaching of the present invention, having a generally J-shaped feed tube, with portions broken away for clarity.

Referring now to the drawings and FIGS. 1 through 6 in particular, there is shown an apparatus 10 for positioning and feeding thin parts utilizing the teaching of the present invention. The apparatus 10 includes a tube 12 which contains thin parts as indicated by reference numerals 14 and 16. The parts are relatively thin in profile or side elevation, as mentioned above, on the order of less than about one hundred mils. This range is not meant to be limiting however, as the invention will accommodate parts of greater thickness with suitably sized separating means and other components. However, it is believed that the present invention provides the most significant advantages over the prior art in the parts size range of less than about one hundred mils, and in particular, between about one to 40 mils.

Figure 3:
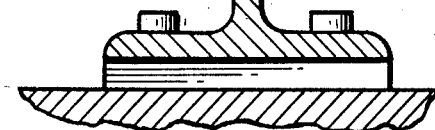
FIG. 3 is a sectional view of the apparatus shown in FIG. 1 along lines 3—3, including a cross-section of an embodiment of a brake means.
Figure 3:
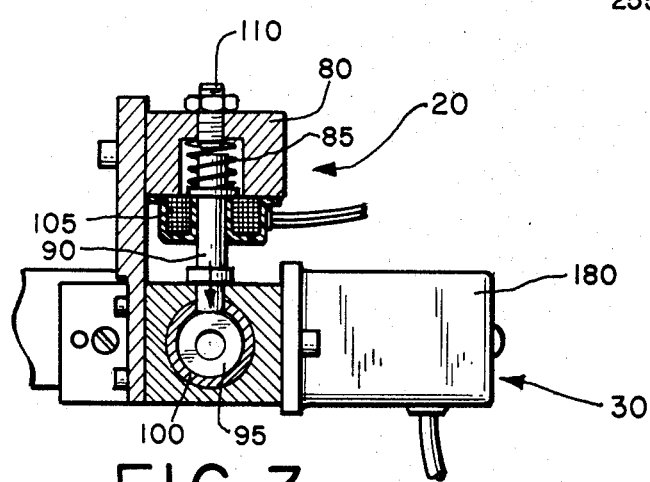

Generally, the parts are stacked in the tube by a section of the feeding means 15. The movement of the parts inside the tube 12 is controlled by brake means 20. A detailed view of the brake means 20 is shown in FIG. 3. The parts move in a direction indicated by arrows 25 in FIG. 1. The movement of the parts is aided by vibrating means 30. Means for separating the parts from one another is shown by numeral 35, located near the dispensing end of the tube 40. Part of the separating means 35 is a magnetic field which affects an area 45 best seen in FIG. 5. Sensing means 50 for measuring the number of parts at the separating means 35 is detailed in FIG. 6. Another embodiment of the present invention operates in a general fashion as described above and is shown in FIG. 7. In that embodiment, a straight tube 55 controls the movement of the parts in a direction indicated by arrow 60.

In the embodiment shown in FIGS. 1 through 6 the tube 12 is J-shaped. The tube 12 may consist of one or several sections. The preferred embodiment shows a tube 12 having a cylindrical section near the loading end 12 and a generally cylindrical section in a support block 120, with an open side covered by a transparent member 130. The parts are loaded into the long end of the tube 12 referred to as the loading end 65. A feed hopper 70 supplies parts to the loading end 65 of the tube 12 through a conduit 75. The present invention contemplates means by which the feed of parts to the tube end 65 will stop once full. Thus, a sensing device such as photoelectric detector 76 with an accompanying light source 77 will trigger the feed hopper 70 to stop once the loading end 65 is full. Other types of devices that sense the presence of a part could be used, such as an ultrasonic sensor, mechanical sensor, magnetic sensor, or proximity switch. The photoelectric detector 76 is unnecessary if a feed hopper is used which runs continuously but only feeds parts when the tube end 65 and the conduit 75 do not have parts contained within.

The parts are stacked as they move into the loading end 65 of the tube 12 because the circumference of the tube 12 corresponds to the circumference of the parts. If a cylindrical tube 12 is used, the parts need not be circular or disc-shaped, as long as the parts can be inscribed in a circle in a generally stable manner. Tubes of other cross-sectional configuration can be used according to the present invention to correspond with the outer configuration of other than circular parts.

As the parts move down the tube 12, they encounter a brake means in the form of a solenoid-operated plunger brake 80 which presses the parts against the wall of the tube, preventing them from passing. The brake means including the solenoid-operated plunger brake 80 is shown in more detail in FIG. 3. When the solenoid brake 80 is deactivated, a spring 85 forces a plunger 90 to press a part 95 against the tube wall 100. When a signal from the sensing means 50 activates the solenoid 105, the force of the spring 85 is overcome, the brake action is released, and the plunger 90 moves against an adjustable stop 110. Thus, when the brake action is released, the parts 95 can flow past the solenoid brake 80 into area 115 as shown in FIG. 1.

In particular, a suitable solenoid 105 is available from Ledex Corporation as Solenoid Model Number 129440-037 Size 4. A suitable spring 85 is available from Dieco Corporation as Model Number MHC-100. However, the present invention contemplates the use of other solenoids and springs, and also other means for controlling movement of the parts along the tube. An example of such other means is a torsion spring mounted lengthwise along a slit made in the tube. The number of parts pressing against the torsion spring controls their movement past the spring.

Figure 2:
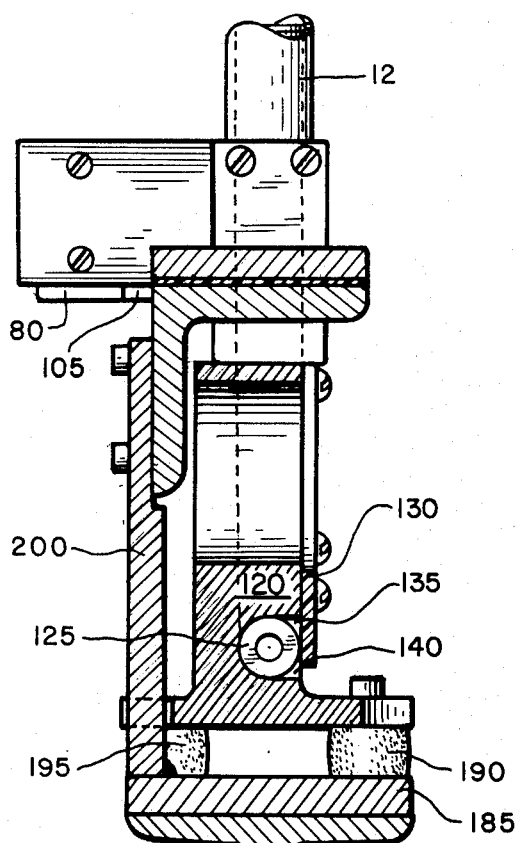
FIG. 2 is a sectional view of the apparatus shown in FIG. 1 along lines 2—2, including a cross-section of a vibrating means.

The tube 12 continues to carry the parts through a support block 120. Referring to FIG. 2, one sees that the tube 12 is provided by an open sided cylindrical portion of the support block 120 in conjunction with a transparent member 130. The part 125 is retained in the tube 12 by a transparent member 130. The entire circumference of the part 125 does not need to be in contact with the tube in order to be appropriately guided. Thus, the tube may be discontinuous, as shown by areas 135 and 140, formed as a part of the support block 120, and still function as contemplated by the present invention.

FIG. 4 depicts one example of means 35 for separating the parts from each other. As the parts move upward in the tube 12 in the direction of the arrows 25, they are influenced by a magnetic field, generated by magnets 145 and 150. Since magnets are used in this preferred embodiment, the parts must be made of material which is magnetic, that is, capable of being magnetized, but not necessarily magnetized. The magnets 145 and 150 of the preferred embodiment are permanent magnets, but suitable electromagnets may also be used. An example of a suitable permanent magnet is Model Number 5U405 made by Industrial Magnet, Inc. The poles on each magnet are aligned so that like poles face each other across the dispensing end 40 of the tube 12.

The effect of the magnetic field on the part 155 near the pick-up end 40 of the tube 12 is demonstrated in FIG. 5. The part 155 has been moved out of contact with the part 160 immediately below it. The magnetic field magnetizes each part so that a magnetic repulsive force is exerted by adjacent parts on one another. When the part 155 at the dispensing end 40 is removed by a pick-up device, the void will be filled by the part which is next in the stack. With the part 155 absent, the part 160 no longer experiences a repelling force on its top side. Thus, the part 160 moves upward to fill the void and is held there by a combination of the forces of the magnetic field and that of gravity.

The sensing means 50 of the preferred embodiment includes a photoelectric detector 170 and a light source 165. A beam of light from the source 165 is projected through the tube end 40 and is measured by the photoelectric detector 170. FIG. 6 depicts the arrangement of the photoelectric detector 170 in more detail. This view is not meant to show the actual number of parts presented at the tube end 40 in detail; approximately twenty to thirty parts such as the part 175 may be affected by the magnetic field of the separating means at any one time. As the parts are removed from the tube end 40, fewer parts like the part 175 will be blocking the light beam from the source 165 projected through the tube 40. Eventually, the intensity of the light beam at the photoelectric detector 170 will increase beyond a preset limit, thus activating an output signal from the photoelectric detector 170.

An example of components for the sensing means 50 includes a photoelectric detector 170 and light source 165 in the form of Model Numbers LR250B and PT250B, using control chassis Model Number BRB with amplifier Model Number B5-14 and optic cable Model Number IF23-S, all made by Banner Engineering Corporation. However, this example is not intended as a limitation. In fact, other means of sensing the number of parts at the separating means, such as an ultrasonic sensor, a mechanical sensor, a magnetic sensor, or a proximity switch are included in the concept of the present invention.

Once the output signal is generated by the photoelectric detector 170, the output signal is conveyed to the solenoid-operated plunger brake 80 to release the brake action in the manner previously discussed above. Parts such as the part 14 will flow past the solenoid brake 80 into the area 115 and push the stack of parts in the direction of the arrows 25 and upward towards the light beam 165. When a sufficient number of parts block the light beam 165, the output signal will cease. Thus, the solenoid brake 80 will prevent more parts from flowing by.

The illustrated preferred embodiment of the present invention vibrates the J-shaped tube in order to aid the movement of the parts. A suitable means of vibrating the tube 12 is to attach an electromagnetic vibrator 180 such as Model Number CM-5 made by Cleveland Vibrator Co. The output signal of the photoelectric detector 170, previously discussed, also activates the vibrating means 30, namely, the electromagnetic vibrator 180. When the output signal ceases, the electromagnetic vibrator 180 stops. For example, according to one J-shaped embodiment of the present invention, with parts of about 30–40 mils thickness, the solenoid brake 80 and electromagnetic vibrator 180 are activated for about 0.75 second, and activation occurs after about 10 to 35 parts are removed from the dispensing end 40 of the tube 12.

Returning to FIG. 2, the block 120 which contains the tube 12 is resiliently connected to a mount 185 which is substantially flat. Rubber inserts like 190 and 195 serve as the resilient connection, although other suitable resilient means may be used. A brace 200 is fixed to the mount 185. The magnets 145 and 150, the photoelectric detector 170, and the light beam source 165 may be mounted upon the brace 200. A gap 205 allows the tube 12 to vibrate without disturbing the stationary brace 200 and items mounted thereon. The gap 205 is best seen in FIG. 5.

Figure 7:
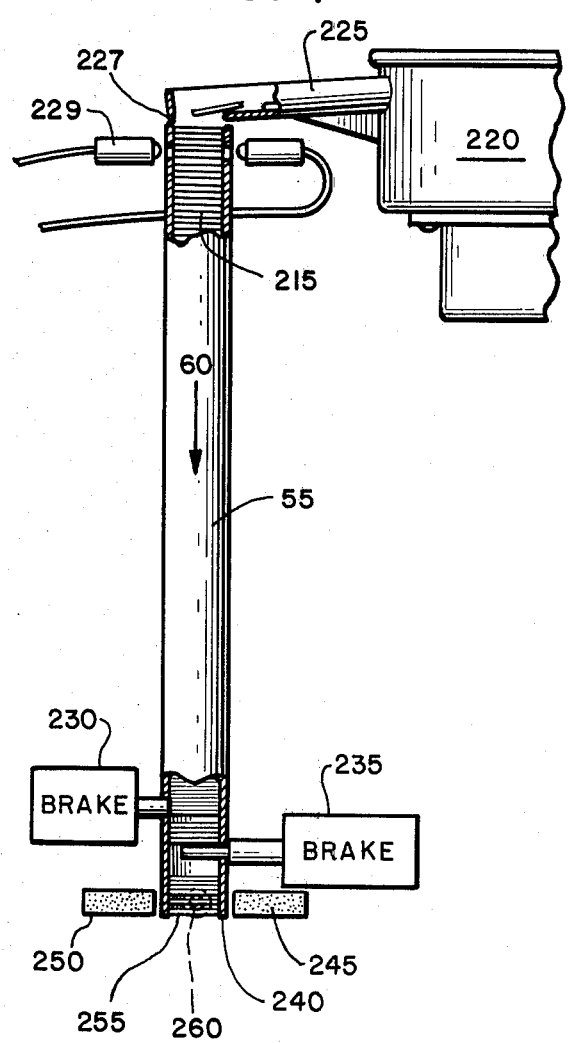
FIG. 7 is a front view of a further embodiment of an apparatus for positioning thin parts utilizing the teaching of the present invention, and having a generally straight feed tube, with portions broken away for clarity.

FIG. 7 depicts another preferred embodiment of by the present invention, having a generally straight-line tube configuration instead of a J-shape. A tube 55 having a substantially straight length aligns the parts like 215 in the tube to form a stack arrangement. The parts are held in bulk in a feed hopper 220 which loads the parts to the tube end 227 by a conduit 225. As discussed previously, the present invention contemplates means by which the feed of parts to the loading tube end 227 will stop once full. Thus, a measuring or sensing device such as a photoelectric detector 229 will trigger the feed hopper 220 to stop once the tube end 227 is full.

The brake means includes a first solenoid-operated plunger brake 230 and a second solenoid-operated plunger brake 235. The first solenoid brake 230 prevents the parts from flowing down the tube 55.

At the dispensing end 240 of the tube 55 two magnets 245 and 250 are arranged so that like poles face each other across the dispensing end 240 of the tube 55. A part 255 is held in the magnetic field ready for pick-up.

A photoelectric detector 260 measures the number of parts present in the area adjacent the dispensing end 240. When too few parts are present, a second solenoid brake 235 is activated by an output signal from the photoelectric detector 260 to release the brake action and the parts which are held between the first solenoid brake 230 and the second solenoid brake 235 flow down into the magnetic field to be separated. The second solenoid brake 235 is then deactivated and the brake action is re-engaged. Subsequently, the first solenoid brake 230 is activated to release the brake action and parts replenish the space between the first solenoid brake 230 and second solenoid brake 235. Then, the first solenoid brake 230 is deactivated and the brake action thereby re-engaged to prevent more parts from flowing down the tube 55.

The apparatus of the present invention can be used with an assembly table on which an article being assembled is positioned. In such a use of the present invention, a part used in the assembling of the article is transferred from the dispensing end of the tube by a non-magnetic means or device.

In addition to the apparatus, the method of executing the operation of the means and devices heretofore discussed is included in the concept of the present invention.

As demonstrated by these embodiments, this invention provides an apparatus and method for feeding and positioning a thin part without relying on a floating arbor arrangement or transverse feeding. Thus, the invention can operate on parts with irregular central openings without substantial bunching, jamming, or interlocking. These embodiments show that the present invention also provides handling, feeding, and positioning of their parts with simple and economical preparation, versatility, and reliability in use.

Various other changes and modifications to the preferred embodiments described herein will be apparent to those skilled in the art. Such changes and modifications can be made without departing from the spirit and scope of the present invention and without diminishing its attendant advantages. It is, therefore, intended that all such changes and modifications be covered by the following claims.

We claim:

1. An apparatus for feeding and positioning thin parts comprising:

a tube for containing a plurality of thin parts in a stack arrangement, having a loading end and a dispensing end, the length of said tube being J-shaped and mounted in a vertical position;

means disposed at said dispensing end of said tube for separating at least one of said parts from the remainder of said plurality of parts and positioning said part at said dispensing end of said tube, said separating means being disposed about the length of said J-shaped tube defining said dispensing end; and means for feeding said plurality of parts from said loading end to said dispensing end, said feeding means including brake means disposed about the length of said J-shaped tube opposite said dispensing end to control movement of said parts along at least a portion of the length of said tube, sensing means disposed near said dispensing end for measuring the number of parts located at said separating means, and means for vibrating at least a portion of said J-shaped tube, said sensing means periodically releasing said brake means when the number of parts located at said separating means falls below a predetermined amount, such that said parts flow along said tube to said separating means, said sensing means re-engaging said brake means when the number of parts located at said separating means reaches the predetermined amount.

2. An apparatus for feeding and positioning thin parts comprising:

a tube for containing a plurality of thin parts in a stack arrangement, having a loading end and a dispensing end, the length of said tube being substantially straight and mounted in a vertical position;

means disposed at said dispensing end of said tube for separating at least one of said parts from the remainder of said plurality of parts and positioning said part at said dispensing end of said tube, said separating means being disposed about the lower end of said straight tube defining said dispensing end; and means for feeding said plurality of parts from said loading end to said dispensing end, said feeding means including brake means disposed above said separating means on said straight tube to control movement of said parts along at least a portion of the length of said tube and sensing means disposed near and dispensing end for measuring the number of parts located at said separating means, said brake means having at least two solenoid-operated plunger brakes, and said sensing means periodically releasing said brake means when the number of parts located at said separating means falls below a predetermined amount, such that said parts flow along said tube to said separating means, said sensing means re-engaging said brake means when the number of parts located at said separating means reaches the predetermined amount.

3. An apparatus for feeding and positioning thin parts comprising:

a tube for containing a plurality of thin parts in a stack arrangement, having a loading end and a dispensing end disposed at an elevation below said loading end;

means disposed at said dispensing end of said tube for separating at least one of said parts from the remainder of said plurality of parts and positioning said part at said dispensing end of said tube; and means for feeding said plurality of parts from said loading end to said dispensing end, said feeding means including brake means disposed along said tube to control movement of said parts and sensing means disposed near said dispensing end for measuring the number of parts located at said separating means, said sensing means periodically releasing said brake means when the number of parts located at said separating means falls below a predetermined amount such that said parts flow along said tube to said separating means, and said sensing means re-engaging said brake means when the number of parts located at said operating means reaches the predetermined amount.

4. An apparatus as recited in claim 1, 2 or 3 wherein said sensing means comprises:

means for projecting a beam of light through said tube near said separating means; and photoelectric detector means for receiving said light beam and for generating an output signal to release said brake means when the intensity of said light beam increases beyond a preset limit.

5. An apparatus as recited in claim 1, wherein said sensing means activates said vibrating means about the same time said brake means is released.

6. An apparatus as recited in claims 1, 2 or 3 further comprising means, adjacent said loading end of said tube, for stacking said parts in said tube.

7. An apparatus as recited in claims 1, 2 or 3 wherein said tube has a circumference substantially corresponding to the circumference of said plurality of parts.

8. An apparatus as recited in claims 1, 2 or 3 wherein said tube has at least one longitudinal slit, so that said slitted tube has a discontinuous circumference.

9. An apparatus as recited in claims 1, 2 or 3 further comprising a mount for said tube, having a substantially flat surface, means for resiliently mounting at least a portion of said tube on said mount, and a brace affixed to said mount for retaining said separating means at the dispensing end of said tube.

10. An apparatus for feeding and positioning thin parts comprising:

a tube for containing a plurality of thin magnetic parts in a stack arrangement, having a loading end and a dispensing end;

means disposed at said dispensing end of said tube for separating at least one of said parts from the remainder of said plurality of parts, and positioning said part at said dispensing end of said tube, said separating means including at least two like magnetic poles disposed at said dispensing end of said tube for generating a magnetic field across said dispensing end of said tube, said magnetic field having sufficient intensity to induce repulsive magnetic forces in said parts so that said parts in said magnetic field do not contact each other; and means for feeding said plurality of parts to said separating means, said feeding means including brake means disposed along said tube to control movement of said parts along the length of said tube and sensing means disposed near said dispensing end of said tube for measuring the number of parts located at said separating means, said sensing means releasing said brake means when the number of parts located at said separating means falls below a predetermined amount, such that said parts flow along said tube to said separating means, and said sensing means re-engaging said brake means when the number of parts located at said separating means reaches the predetermined amount.

11. An assembly machine for use in manufacturing an article comprising:

an assembly table on which at least a portion of the article is positioned;

a tube containing a plurality of thin magnetic parts in a stack arrangement, having a loading end and a dispensing end;

pick-up means for removing one of said parts from a dispensing end of said tube and transferring said part to said assembly table, wherein the portion of said pick-up means that contacts said part is non-magnetic;

means disposed near the dispensing end of said tube for separating at least one of said parts from the stack and positioning said part at the dispensing end of said tube for removal by said pick-up means, said separating means including at least two like magnetic poles disposed at the dispensing end of said tube for generating a magnetic field across said dispensing end of said tube, said magnetic field having sufficient intensity to induce repulsive magnetic forces in said parts so that said parts in said magnetic field do not contact each other and sufficient intensity to position one of said parts at the dispensing end of said tube for removal by said pick-up means; and means for feeding said plurality of parts from the loading end to the dispensing end of the tube, said feeding means including a brake means disposed along said tube to control movement of said parts along the length of said tube and a sensing means disposed near said dispensing end of said tube for measuring the number of parts located at said separating means, said sensing means releasing said brake means when the number of parts located at said separating means falls below a predetermined amount, such that said parts flow along the length of said tube to said separating means, and said sensing means re-engaging said brake means when the number of parts located at said separating means reaches the predetermined amount.

12. A method for feeding and positioning thin parts to be grasped by a device, said thin parts being capable of being magnetized, said method comprising:

inserting a plurality of thin parts capable of being magnetized into a loading end of a tube to form a stack;

applying a magnetic field to said thin parts at a dispensing end of said tube disposed at an elevation below said loading end, to separate one of said parts from the stack and position said part for pick-up at said dispensing end; and feeding said plurality of parts from said loading end of said tube to said dispensing end by:

disposing brake means along said tube to control movement of said parts;

measuring the number of said parts at said dispensing end;

releasing said brake means when the number of parts at said dispensing end falls below a predetermined amount; and re-engaging said brake means when the number of parts at said dispensing end reaches the predetermined amount.

13. A method as recited in claim 12, wherein said measuring step includes:

projecting a light beam through said tube;

receiving said light beam by photoelectric detector means; and generating an output signal to activate said brake means when the intensity of said light beam increases beyond a preset limit.

14. A method as recited in claim 12, wherein said stacking step includes vibrating said parts out of a hopper and directing said parts into said tube.

15. A method as recited in claim 12, wherein said method further comprises removing said positioned part from the end of said tube and placing said part on an assembly table.

* * * * *

UNITED STATES PATENT AND TRADEMARK OFFICE
CERTIFICATE OF CORRECTION

PATENT NO. : 4,372,463
DATED : February 8, 1983
INVENTOR(S) : Patrick D. Notarione, Ronald K. Turk, and Gerald Grafius It is certified that error appears in the above—identified patent and that said Letters Patent is hereby corrected as shown below:

Column 2, line 15, delete "provide" and substitute therefor --provides--;

Column 6, line 35, delete "by";

Column 8, line 14, delete "and", and substitute therefor --said--;

Column 8, line 49, delete "claim" and substitute therefor --claims--.

Signed and Sealed this

Twenty-third Day of August 1983

[SEAL]

Attest:

GERALD J. MOSSINGHOFF

*Attesting Officer*   *Commissioner of Patents and Trademarks*